United States Patent
Hayashi et al.

(10) Patent No.: US 11,347,811 B2
(45) Date of Patent: May 31, 2022

(54) STATE ANALYSIS DEVICE, STATE ANALYSIS METHOD, AND STORAGE MEDIUM

(71) Applicants: Kabushiki Kaisha Toshiba, Minato-ku (JP); Toshiba Digital Solutions Corporation, Kawasaki (JP)

(72) Inventors: Tetsuya Hayashi, Arakawa (JP); Minoru Nishizawa, Itabashi (JP); Kozo Banno, Yokohama (JP); Yasuomi Une, Kawasaki (JP); Shigeru Matsumoto, Nishitokyo (JP)

(73) Assignees: Kabushiki Kaisha Toshiba, Minato-ku (JP); Toshiba Digital Solutions Corporation, Kawasaki (JP)

(*) Notice: Subject to any disclaimer, the term of this patent is extended or adjusted under 35 U.S.C. 154(b) by 258 days.

(21) Appl. No.: 16/481,278

(22) PCT Filed: Sep. 25, 2017

(86) PCT No.: PCT/JP2017/034559
§ 371 (c)(1),
(2) Date: Jul. 26, 2019

(87) PCT Pub. No.: WO2018/142665
PCT Pub. Date: Aug. 9, 2018

(65) Prior Publication Data
US 2020/0042556 A1  Feb. 6, 2020

(30) Foreign Application Priority Data

Jan. 31, 2017 (JP) .............................. JP2017-015497

(51) Int. Cl.
*G06F 16/906* (2019.01)
*G06F 16/904* (2019.01)
*G06K 9/62* (2022.01)

(52) U.S. Cl.
CPC .......... *G06F 16/906* (2019.01); *G06F 16/904* (2019.01); *G06K 9/6267* (2013.01)

(58) Field of Classification Search
CPC ... G06F 16/21; G06F 16/951; B01L 2200/143
(Continued)

(56) References Cited

U.S. PATENT DOCUMENTS

| | | | | |
|---|---|---|---|---|
| 2010/0092029 A1* | 4/2010 | Spitzig | ................... | G06K 9/209 |
| | | | | 382/101 |
| 2016/0073257 A1* | 3/2016 | Duncan | ................... | G06F 3/016 |
| | | | | 726/7 |

FOREIGN PATENT DOCUMENTS

JP  2010-250769 A  11/2010

OTHER PUBLICATIONS

International Search Report dated Dec. 12, 2017 in PCT/JP2017/034559 filed on Sep. 25, 2017.

* cited by examiner

*Primary Examiner* — Baoquoc N To
(74) *Attorney, Agent, or Firm* — Oblon, McClelland, Maier & Neustadt, L.L.P.

(57) ABSTRACT

A state analysis device includes a data classification unit, an analysis unit, and a determination unit. The data classification unit is configured to classify input data for each of a plurality of verification items associated with each of a plurality of control items. The analysis unit is configured to execute analysis associated with each combination of a plurality of control items and a plurality of verification items on the basis of data classified by the data classification unit. The determination unit is configured to comprehensively determine analysis results in units of combinations of the control items and the verification items on the basis of analysis results analyzed by the analysis unit.

8 Claims, 20 Drawing Sheets

(58) Field of Classification Search
USPC .......................................................... 707/705
See application file for complete search history.

FIG. 2

| PRODUCT NO. | DATA 1 | DATA 2 | RESULT 1 | RESULT 2 |
|---|---|---|---|---|
| L0000001 | A | 10.25 | 1 | 0.8 |
| L0000002 | A | 9.25 | 0 | 0.97 |
| L0000003 | A | 8.33 | 1 | 0.85 |
| L0000004 | A | 9.01 | 0 | 0.99 |
| L0000005 | A | 7.85 | 1 | 0.9 |
| L0000006 | A | 8.1 | 1 | 0.89 |
| L0000007 | B | 8.1 | 1 | 0.88 |
| L0000008 | B | 9.01 | 0 | 1 |
| L0000009 | B | 8.33 | 0 | 0.99 |
| L0000010 | B | 10.25 | 1 | 0.81 |
| L0000011 | B | 6.25 | 1 | 0.79 |
| L0000012 | B | 7.88 | 1 | 0.8 |
| L0000013 | B | 8.33 | 1 | 0.85 |
| L0000014 | B | 10.25 | 0 | 0.98 |
| L0000015 | B | 9.01 | 0 | 0.97 |
| L0000016 | B | 9.25 | 1 | 0.86 |
| L0000017 | B | 9.01 | 1 | 0.81 |
| L0000018 | B | 7.85 | 1 | 0.83 |

FIG. 3

| COLUMN NAME | VARIABLE DEFINITION |
|---|---|
| DATA 1 | EXPLANATORY VARIABLE |
| DATA 2 | EXPLANATORY VARIABLE |
| RESULT 1 | OBJECTIVE VARIABLE |
| RESULT 2 | OBJECTIVE VARIABLE |

FIG. 4

| 4M | VERIFICATION ITEM |
|---|---|
| Man | DEFECTIVE DEVIATION |
| Man | DEFECTIVE VARIATION |
| Man | INITIAL-STAGE DEFECT |
| Man | ABRASION DEFECT |
| Machine | DEFECTIVE DEVIATION |
| Machine | DEFECTIVE VARIATION |
| Machine | INITIAL-STAGE DEFECT |
| Machine | ABRASION DEFECT |
| Material | DEFECTIVE DEVIATION |
| Material | DEFECTIVE VARIATION |
| Material | INITIAL-STAGE DEFECT |
| Material | ABRASION DEFECT |
| Method | DEFECTIVE DEVIATION |
| Method | DEFECTIVE VARIATION |
| Method | INITIAL-STAGE DEFECT |
| Method | ABRASION DEFECT |
| Other | DEFECTIVE DEVIATION |
| Other | DEFECTIVE VARIATION |
| Other | INITIAL-STAGE DEFECT |
| Other | ABRASION DEFECT |

FIG. 5

| COLUMN NAME | 4M DEFINITION |
|---|---|
| DATA 1 | Material |
| DATA 2 | Machine |

FIG. 6A

| COLUMN NAME | 4M DEFINITION | VERIFICATION ITEM DEFINITION |
|---|---|---|
| DATA 1 | Material | DEFECTIVE DEVIATION |
| DATA 1 | Material | DEFECTIVE VARIATION |
| DATA 1 | Material | INITIAL-STAGE DEFECT |
| DATA 1 | Material | ABRASION DEFECT |
| DATA 2 | Machine | DEFECTIVE DEVIATION |
| DATA 2 | Machine | DEFECTIVE VARIATION |
| DATA 2 | Machine | INITIAL-STAGE DEFECT |
| DATA 2 | Machine | ABRASION DEFECT |

FIG. 6B

| 4M | ANALYSIS ITEM | DATA |
|---|---|---|
| Man | DEFECTIVE DEVIATION | |
| Man | DEFECTIVE VARIATION | |
| Man | INITIAL-STAGE DEFECT | |
| Man | ABRASION DEFECT | |
| Machine | DEFECTIVE DEVIATION | DATA 2 |
| Machine | DEFECTIVE VARIATION | DATA 2 |
| Machine | INITIAL-STAGE DEFECT | DATA 2 |
| Machine | ABRASION DEFECT | DATA 2 |
| Material | DEFECTIVE DEVIATION | DATA 1 |
| Material | DEFECTIVE VARIATION | DATA 1 |
| Material | INITIAL-STAGE DEFECT | DATA 1 |
| Material | ABRASION DEFECT | DATA 1 |
| Method | DEFECTIVE DEVIATION | |
| Method | DEFECTIVE VARIATION | |
| Method | INITIAL-STAGE DEFECT | |
| Method | ABRASION DEFECT | |
| Other | DEFECTIVE DEVIATION | |
| Other | DEFECTIVE VARIATION | |
| Other | INITIAL-STAGE DEFECT | |
| Other | ABRASION DEFECT | |

FIG. 7

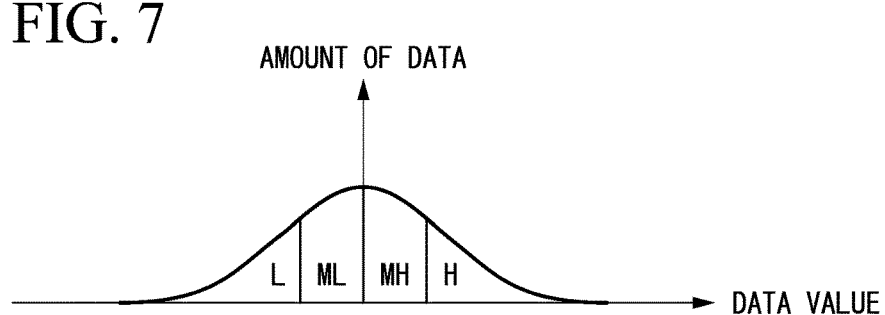

FIG. 8

| DATA 2 | DATA 2 AFTER DISCRETIZATION |
|---|---|
| 10.25 | H |
| 9.25 | H |
| 8.33 | MH |
| 9.01 | H |
| 7.85 | ML |
| 8.1 | MH |
| 8.1 | MH |
| 9.01 | H |
| 6.25 | L |

FIG. 13

| DATA 1 | NUMBER OF SAMPLES | AVERAGE VALUE OF OBJECTIVE VARIABLE 2 | STANDARD DEVIATION OF OBJECTIVE VARIABLE 2 |
|---|---|---|---|
| A | 165 | 0.9 | 0.07 |
| OTHER THAN A | 156 | 0.8 | 0.069 |

FIG. 14

| DATA VALUE | t-TEST p-VALUE |
|---|---|
| DATA 1=A | 0.001 |
| DATA 1=B | 0.5 |
| DATA 2=H | 0.06 |
| DATA 2=MH | 0.002 |

FIG. 15

| DATA VALUE | OBJECTIVE VARIABLE 1= "1" | OBJECTIVE VARIABLE 1= "0" |
|---|---|---|
| DATA 1=A | 105 | 60 |
| DATA 1=OTHER THAN A | 55 | 101 |

FIG. 16

| DATA VALUE | Fisher TEST p-VALUE |
|---|---|
| DATA 1=A | 0.006 |
| DATA 1=B | 0.4 |
| DATA 2=H | 0.01 |
| DATA 2=MH | 0.05 |

FIG. 17

| DATA 1 | NUMBER OF SAMPLES | STANDARD DEVIATION OF OBJECTIVE VARIABLE 2 |
|---|---|---|
| A | 165 | 0.07 |
| OTHER THAN A | 156 | 0.069 |

FIG. 18

| DATA VALUE | F-TEST p-VALUE |
|---|---|
| DATA 1=A | 0.5 |
| DATA 1=B | 0.04 |
| DATA 2=H | 0.1 |
| DATA 2=MH | 0.05 |

FIG. 19

| PRODUCT NO. | DATA 1 | COUNTER OF DATA 1=A | COUNTER OF DATA 1=B | PERIOD OF DATA 1=A | PERIOD OF DATA 1=B | RESULT 1 | RESULT 2 |
|---|---|---|---|---|---|---|---|
| L0000001 | A | 1 |  | INITIAL STAGE |  | 1 | 0.8 |
| L0000002 | A | 2 |  | INITIAL STAGE |  | 0 | 0.97 |
| L0000003 | A | 3 |  | MEDIUM STAGE |  | 1 | 0.85 |
| L0000004 | A | 4 |  | MEDIUM STAGE |  | 0 | 0.99 |
| L0000005 | A | 5 |  | LATE STAGE |  | 1 | 0.9 |
| L0000006 | A | 6 |  | LATE STAGE |  | 1 | 0.89 |
| L0000007 | B |  | 1 |  | INITIAL STAGE | 1 | 0.88 |
| L0000008 | B |  | 2 |  | INITIAL STAGE | 0 | 1 |
| L0000009 | B |  | 3 |  | INITIAL STAGE | 0 | 0.99 |
| L0000010 | B |  | 4 |  | INITIAL STAGE | 1 | 0.81 |
| L0000011 | B |  | 5 |  | MEDIUM STAGE | 1 | 0.79 |
| L0000012 | B |  | 6 |  | MEDIUM STAGE | 1 | 0.8 |
| L0000013 | B |  | 7 |  | MEDIUM STAGE | 1 | 0.85 |
| L0000014 | B |  | 8 |  | MEDIUM STAGE | 0 | 0.98 |
| L0000015 | B |  | 9 |  | LATE STAGE | 0 | 0.97 |
| L0000016 | B |  | 10 |  | LATE STAGE | 1 | 0.86 |
| L0000017 | B |  | 11 |  | LATE STAGE | 1 | 0.81 |
| L0000018 | B |  | 12 |  | LATE STAGE | 1 | 0.83 |
| L0000019 | A | 1 |  | INITIAL STAGE |  | 1 | 0.85 |
| L0000020 | A | 2 |  | INITIAL STAGE |  | 1 | 0.89 |

FIG. 20

| DATA 1 | NUMBER OF SAMPLES | AVERAGE VALUE OF OBJECTIVE VARIABLE 2 | STANDARD DEVIATION OF OBJECTIVE VARIABLE 2 |
|---|---|---|---|
| A: INITIAL STAGE | 35 | 0.82 | 0.07 |
| A: OTHER THAN INITIAL STAGE | 286 | 0.95 | 0.069 |

FIG. 21

|  | OBJECTIVE VARIABLE 1="1" | OBJECTIVE VARIABLE 1="0" |
|---|---|---|
| DATA 1=A: INITIAL STAGE | 115 | 50 |
| DATA 1=A: OTHER THAN INITIAL STAGE | 206 | 271 |

FIG. 22

| DATA VALUE | TEST p-VALUE |
|---|---|
| DATA 1=A: INITIAL STAGE | 0.0051 |
| DATA 1=B: INITIAL STAGE | 0.3 |
| DATA 2=H: INITIAL STAGE | 0.02 |
| DATA 2=MH: INITIAL STAGE | 0.05 |

FIG. 23

| DATA VALUE | DEFINITION OF 4M | OBJECTIVE VARIABLE | ANALYSIS UNIT | TEST p-VALUE |
|---|---|---|---|---|
| DATA 1=A | Man | OBJECTIVE VARIABLE 1 | DEFECTIVE DEVIATION | 0.0051 |
| DATA 1=A | Man | OBJECTIVE VARIABLE 2 | DEFECTIVE DEVIATION | 0.04 |
| DATA 1=B | Man | OBJECTIVE VARIABLE 1 | DEFECTIVE DEVIATION | 0.031 |
| DATA 1=B | Man | OBJECTIVE VARIABLE 2 | DEFECTIVE DEVIATION | 0.0021 |
| DATA 2=H | Machine | OBJECTIVE VARIABLE 1 | DEFECTIVE DEVIATION | 0.001 |
| DATA 2=H | Machine | OBJECTIVE VARIABLE 2 | DEFECTIVE DEVIATION | 0.053 |
| DATA 2=MH | Machine | OBJECTIVE VARIABLE 1 | DEFECTIVE DEVIATION | 0.1 |
| DATA 2=MH | Machine | OBJECTIVE VARIABLE 2 | DEFECTIVE DEVIATION | 0.2 |
| DATA 3=C | Material | OBJECTIVE VARIABLE 1 | DEFECTIVE DEVIATION | 0.022 |
| DATA 3=C | Material | OBJECTIVE VARIABLE 2 | DEFECTIVE DEVIATION | 0.054 |
| DATA 3=D | Material | OBJECTIVE VARIABLE 1 | DEFECTIVE DEVIATION | 0.044 |
| DATA 3=D | Material | OBJECTIVE VARIABLE 2 | DEFECTIVE DEVIATION | 0.033 |
| DATA 4=L | Method | OBJECTIVE VARIABLE 1 | DEFECTIVE DEVIATION | 0.0012 |
| DATA 4=L | Method | OBJECTIVE VARIABLE 2 | DEFECTIVE DEVIATION | 0.06 |
| DATA 4=MH | Method | OBJECTIVE VARIABLE 1 | DEFECTIVE DEVIATION | 0.7 |
| DATA 4=MH | Method | OBJECTIVE VARIABLE 2 | DEFECTIVE DEVIATION | 0.9 |
| DATA 5=E | Other | OBJECTIVE VARIABLE 1 | DEFECTIVE DEVIATION | 0.058 |
| DATA 5=E | Other | OBJECTIVE VARIABLE 2 | DEFECTIVE DEVIATION | 0.001 |
| DATA 5=F | Other | OBJECTIVE VARIABLE 1 | DEFECTIVE DEVIATION | 0.025 |
| DATA 5=F | Other | OBJECTIVE VARIABLE 2 | DEFECTIVE DEVIATION | 0.041 |

FIG. 24

| CLASSIFICATION OF 4M | ANALYSIS UNIT | p-VALUE AFTER TOTALIZATION |
|---|---|---|
| Man | DEFECTIVE DEVIATION | 0.0021 |
| Man | DEFECTIVE VARIATION | 0.1 |
| Man | INITIAL-STAGE DEFECT | 0.05 |
| Man | ABRASION DEFECT | 0.011 |
| Machine | DEFECTIVE DEVIATION | 0.001 |
| Machine | DEFECTIVE VARIATION | 0.041 |
| Machine | INITIAL-STAGE DEFECT | 0.032 |
| Machine | ABRASION DEFECT | 0.055 |
| Material | DEFECTIVE DEVIATION | 0.022 |
| Material | DEFECTIVE VARIATION | 0.002 |
| Material | INITIAL-STAGE DEFECT | 0.5 |
| Material | ABRASION DEFECT | 0.9 |
| Method | DEFECTIVE DEVIATION | 0.0012 |
| Method | DEFECTIVE VARIATION | 0.85 |
| Method | INITIAL-STAGE DEFECT | 0.75 |
| Method | ABRASION DEFECT | 0.003 |
| Other | DEFECTIVE DEVIATION | 0.001 |
| Other | DEFECTIVE VARIATION | 0.2 |
| Other | INITIAL-STAGE DEFECT | 0.001 |

FIG. 25

| CONTROL ITEM \ VERIFICATION ITEM | DEFECTIVE DEVIATION | DEFECTIVE VARIATION | INITIAL-STAGE FAILURE TYPE | ABRASION FAILURE TYPE |
|---|---|---|---|---|
| A. Man | NO DATA | | | |
| B. Machine | | NO DATA | | |
| C. Material | | | | |
| D. Method | NO DATA | | | |
| E. Other | | | | |

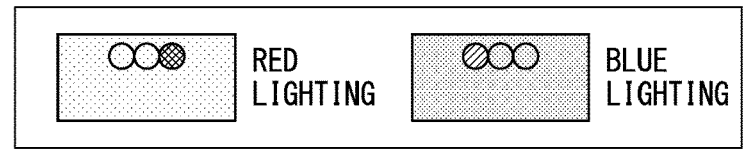

RED LIGHTING / BLUE LIGHTING

FIG. 29

| COLUMN NAME | VARIABLE DEFINITION |
|---|---|
| DATA 1 | GROUP VARIABLE |
| DATA 2 | EXPLANATORY VARIABLE |
| RESULT 1 | OBJECTIVE VARIABLE |
| RESULT 2 | OBJECTIVE VARIABLE |

FIG. 30

| 4M | VERIFICATION ITEM |
|---|---|
| Man | DEFECTIVE DEVIATION |
| Man | DEFECTIVE VARIATION |
| Man | INITIAL-STAGE DEFECT |
| Man | ABRASION DEFECT |
| Man | SHEWHART |
| Machine | DEFECTIVE DEVIATION |
| Machine | DEFECTIVE VARIATION |
| Machine | INITIAL-STAGE DEFECT |
| Machine | ABRASION DEFECT |
| Machine | SHEWHART |
| Material | DEFECTIVE DEVIATION |
| Material | DEFECTIVE VARIATION |
| Material | INITIAL-STAGE DEFECT |
| Material | ABRASION DEFECT |
| Material | SHEWHART |
| Method | DEFECTIVE DEVIATION |
| Method | DEFECTIVE VARIATION |
| Method | INITIAL-STAGE DEFECT |
| Method | ABRASION DEFECT |
| Method | SHEWHART |
| Other | DEFECTIVE DEVIATION |
| Other | DEFECTIVE VARIATION |
| Other | INITIAL-STAGE DEFECT |
| Other | ABRASION DEFECT |
| Other | SHEWHART |

FIG. 31

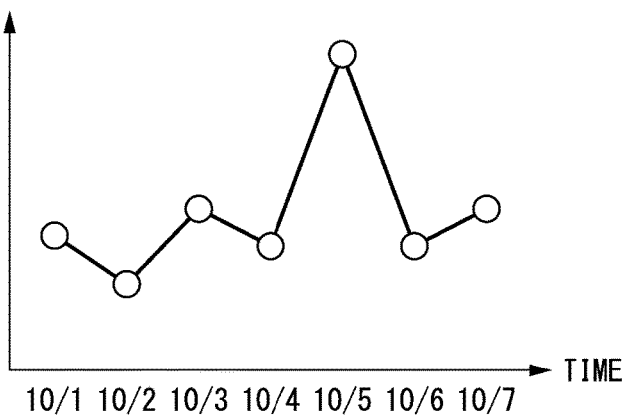

FIG. 32

| ABNORMALITY DETERMINATION RULE | REALIZATION PROBABILITY | CALCULATION EXPRESSION |
|---|---|---|
| RULE 1: CONTROL OUT | 0.0027 | PROBABILITY EXCEEDING $\pm 3\sigma$ |
| RULE 2: SERIES OF CONSECUTIVE 9 POINTS | 0.0039 | $2 \times 0.5^9$ |
| RULE 3: TENDENCY TOWARD INCREASE OR DECREASE IN CONSECUTIVE 6 POINTS | — | — |
| RULE 4: CONSECUTIVE 14 POINTS INCREASE OR DECREASE ALTERNATELY | — | — |
| RULE 5: TWO OF CONSECUTIVE 3 POINTS ARE BETWEEN LIMIT LINE AND $2\sigma$ | 0.0009 | $2 \times 0.0215^2$ |
| RULE 6: FOUR OF CONSECUTIVE 5 POINTS ARE BETWEEN LIMIT LINE AND $1\sigma$ | 0.0012 | $2 \times (0.0215+0.1359)^4$ |
| RULE 7: CONSECUTIVE 15 POINTS ARE WITHIN $1\sigma$ FROM CENTER LINE | 0.0032 | $0.6826^{15}$ |
| RULE 8: CONSECUTIVE 8 POINTS ARE OUT OF $1\sigma$ FROM CENTER LINE | 0.0001 | $(1-0.6826)^8$ |

FIG. 33

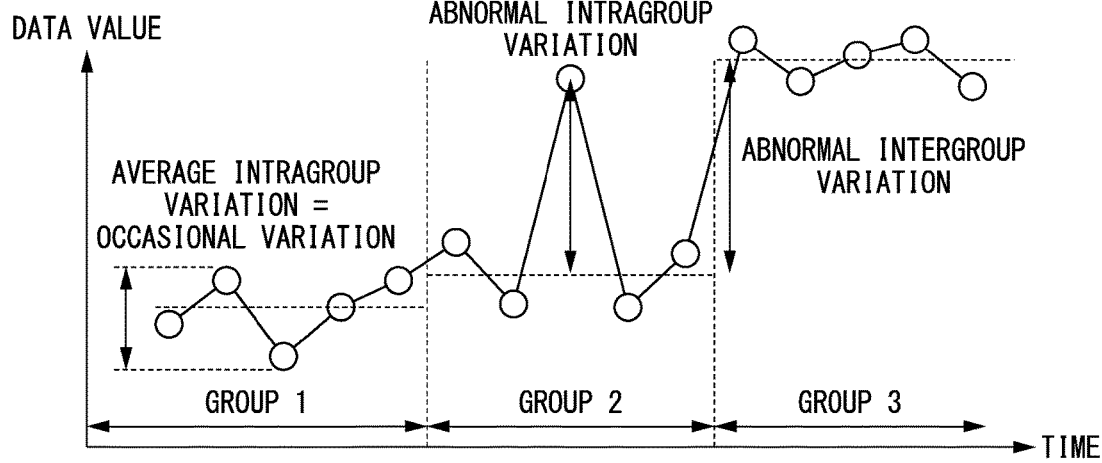

| PRODUCT NO. | DATA 1 | DATA 2 | RESULT 1 | RESULT 2 | |
|---|---|---|---|---|---|
| L0000001 | A | 10.25 | 1 | 0.8 | ⎫ |
| L0000002 | A | 9.25 | 0 | 0.97 | |
| L0000003 | A | 8.33 | 1 | 0.85 | ⎬ GROUP 1 |
| L0000004 | A | 9.01 | 0 | 0.99 | |
| L0000005 | A | 7.85 | 1 | 0.9 | |
| L0000006 | A | 8.1 | 1 | 0.89 | ⎭ |
| L0000007 | B | 8.1 | 1 | 0.88 | ⎫ |
| L0000008 | B | 9.01 | 0 | 1 | |
| L0000009 | B | 8.33 | 0 | 0.99 | |
| L0000010 | B | 10.25 | 1 | 0.81 | ⎬ GROUP 2 |
| L0000011 | B | 6.25 | 1 | 0.79 | |
| L0000012 | B | 7.88 | 1 | 0.8 | |
| L0000013 | B | 8.33 | 1 | 0.85 | ⎭ |
| L0000014 | A | 10.25 | 0 | 0.98 | ⎫ |
| L0000015 | A | 9.01 | 0 | 0.97 | ⎬ GROUP 3 |
| L0000016 | A | 9.25 | 1 | 0.86 | ⎭ |
| L0000017 | C | 9.01 | 1 | 0.81 | ⎫ |
| L0000018 | C | 7.85 | 1 | 0.83 | ⎬ GROUP 4 |
| L0000019 | C | 8.26 | 1 | 0.83 | |
| L0000020 | C | 8.85 | 1 | 0.83 | ⎭ |

FIG. 36

| GROUP | STATISTIC OF DATA 2 |
|---|---|
| GROUP 1 | 8.8 |
| GROUP 2 | 8.3 |
| GROUP 3 | 9.5 |
| GROUP 4 | 8.5 |
| GROUP 5 | 42.3 |
| GROUP 6 | 9.5 |
| GROUP 7 | 8.5 |
| GROUP 8 | 7.5 |
| GROUP 9 | 8.3 |
| GROUP 10 | 9.5 |

FIG. 37

| GROUP | STATISTIC OF DATA 2 | ABNORMALITY DETERMINATION OF DATA 2 |
|---|---|---|
| GROUP 1 | 8.8 | |
| GROUP 2 | 8.3 | |
| GROUP 3 | 9.5 | |
| GROUP 4 | 8.5 | |
| GROUP 5 | 42.3 | ABNORMALITY RULE 1 |
| GROUP 6 | 9.5 | |
| GROUP 7 | 8.5 | |
| GROUP 8 | 7.5 | |
| GROUP 9 | 8.3 | |
| GROUP 10 | 9.5 | |

FIG. 38

| PRODUCT NO. | DATA 1 | GROUP | DATA 2 | ABNORMALITY DETERMINATION OF DATA 2 | RESULT 1 | RESULT 2 |
|---|---|---|---|---|---|---|
| L0000001 | A | GROUP 1 | 10.25 | | 1 | 0.8 |
| L0000002 | A | GROUP 1 | 9.25 | | 0 | 0.97 |
| L0000003 | A | GROUP 1 | 8.33 | | 1 | 0.85 |
| L0000004 | A | GROUP 1 | 9.01 | | 0 | 0.99 |
| L0000005 | A | GROUP 1 | 7.85 | | 1 | 0.9 |
| L0000006 | A | GROUP 1 | 8.1 | | 1 | 0.89 |
| L0000007 | B | GROUP 2 | 8.1 | | 1 | 0.88 |
| L0000008 | B | GROUP 2 | 9.01 | | 0 | 1 |
| L0000009 | B | GROUP 2 | 8.33 | | 0 | 0.99 |
| L0000010 | B | GROUP 2 | 10.25 | | 1 | 0.81 |
| L0000011 | B | GROUP 2 | 6.3 | | 1 | 0.79 |
| L0000012 | B | GROUP 2 | 7.88 | | 1 | 0.8 |
| L0000013 | B | GROUP 2 | 8.3 | | 1 | 0.85 |
| L0000014 | A | GROUP 3 | 10.25 | | 0 | 0.98 |
| L0000015 | A | GROUP 3 | 9.01 | | 0 | 0.97 |
| L0000016 | A | GROUP 3 | 9.25 | | 1 | 0.86 |
| L0000017 | C | GROUP 4 | 9.01 | | 1 | 0.81 |
| L0000018 | C | GROUP 4 | 7.85 | | 1 | 0.83 |
| L0000019 | C | GROUP 4 | 8.26 | | 1 | 0.83 |
| L0000020 | C | GROUP 4 | 8.85 | | 1 | 0.83 |
| L0000021 | B | GROUP 5 | 42.5 | ABNORMALITY RULE 1 | 1 | 0.73 |
| L0000022 | B | GROUP 5 | 42.2 | ABNORMALITY RULE 1 | 1 | 0.72 |
| L0000023 | B | GROUP 5 | 42.3 | ABNORMALITY RULE 1 | 1 | 0.71 |

FIG. 39

| ABNORMALITY DETERMINATION OF DATA 2 | NUMBER OF SAMPLES | AVERAGE VALUE OF OBJECTIVE VARIABLE 2 | STANDARD DEVIATION OF OBJECTIVE VARIABLE 2 |
|---|---|---|---|
| ABNORMAL | 165 | 0.71 | 0.0069 |
| NORMAL | 156 | 0.91 | 0.0082 |

FIG. 40

| ABNORMALITY DETERMINATION OF DATA 2 | OBJECTIVE VARIABLE 1= "1" | OBJECTIVE VARIABLE 1= "0" |
|---|---|---|
| ABNORMAL | 105 | 60 |
| NORMAL | 55 | 101 |

FIG. 41

| CONTROL ITEM \ VERIFICATION ITEM | DEFECTIVE DEVIATION | DEFECTIVE VARIATION | INITIAL-STAGE FAILURE TYPE | ABRASION FAILURE TYPE | ANALYSIS BASED ON SHEWHART'S CONTROL CHART |
|---|---|---|---|---|---|
| A. Man | NO DATA | | | | |
| B. Machine | | NO DATA | | | |
| C. Material | | | | | |
| D. Method | NO DATA | | | | |
| E. Other | | | | | |

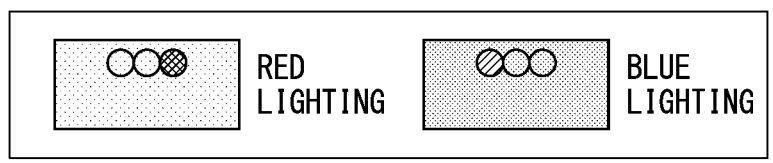

RED LIGHTING    BLUE LIGHTING

STATE ANALYSIS DEVICE, STATE ANALYSIS METHOD, AND STORAGE MEDIUM

TECHNICAL FIELD

Embodiments of the present invention relate to a state analysis device, a state analysis method, and a storage medium.

BACKGROUND ART

Attempts have been made to analyze the states of defect factors or the like occurring at manufacturing sites using data accumulated in a manufacturing process. In order to analyze the state of a product from the accumulated data, a visualization interface is provided. In existing visualization interfaces, analysis techniques for analyzing states may be restricted or analysis techniques may not be able to be added.

CITATION LIST

Patent Document

[Patent Document 1]
Japanese Unexamined Patent Application, First Publication No. 2010-250769

SUMMARY OF INVENTION

Technical Problem

A problem to be solved by the present invention is to provide a state analysis device, a state analysis method, and a storage medium which make it possible to analyze states occurring in a product using various analysis techniques.

Solution to Problem

A state analysis device of an embodiment includes a data classification unit, an analysis unit, and a determination unit. The data classification unit is configured to classify input data in accordance with which of a plurality of verification items associated with a plurality of control items the data corresponds to. The analysis unit is configured to analyze the presence or absence of a failure in each combination of the plurality of control items and the plurality of verification items (indicating data relevant to an objective variable; the same hereinafter; since analysis intended to discover negative data such as factors for the occurrence of defects or a decrease in yield rate in the present specification is cited as an example, the word "failure" is used in order to make it easier to understand, but is not necessarily limited to negative ones) on the basis of the data classified by the data classification unit. The determination unit is configured to determine analysis results for each combination of the control items and the verification items on the basis of analysis results analyzed by the analysis unit.

BRIEF DESCRIPTION OF DRAWINGS

FIG. 2 is a diagram showing an example of input data.

FIG. 3 is a diagram showing an example in which variables of data are defined.

FIG. 4 is a diagram showing a plurality of verification items which are allocated to each control item of 4M.

FIG. 5 is a diagram showing relationships between data elements of input data and control items of 4M.

FIG. 6A is a diagram showing verification items for data elements of input data.

FIG. 6B is a diagram showing a mapping result.

FIG. 7 is a diagram showing a process of discretizing explanatory variables which are continuous values.

FIG. 8 is a diagram showing discretized explanatory variables.

FIG. 13 is a diagram showing a t-test which is performed by a defective deviation analysis unit.

FIG. 14 is a diagram showing a calculation result of a list of p-values of the t-test which is performed by the defective deviation analysis unit.

FIG. 15 is a diagram showing a Fisher test which is performed by the defective deviation analysis unit.

FIG. 16 is a diagram showing a calculation result of a list of p-values of the Fisher test which is performed by the defective deviation analysis unit.

FIG. 17 is a diagram showing an F-test which is performed by the defective variation analysis unit.

FIG. 18 is a diagram showing a calculation result of a list of p-values of the F-test which is performed by the defective variation analysis unit.

FIG. 19 is a diagram showing data that is preprocessed before a test.

FIG. 20 is a diagram showing a t-test which is performed by an initial-stage defect analysis unit.

FIG. 21 is a diagram showing a Fisher test which is performed by the initial-stage defect analysis unit.

FIG. 22 is a diagram showing a calculation result of a list of p-values of an F-test which is performed by the initial-stage defect analysis unit.

FIG. 23 is a diagram in which analysis results in a case where an analysis unit is the defective deviation analysis unit are totalized.

FIG. 24 is a diagram in which analysis results of all the analysis units are totalized.

FIG. 25 is a diagram showing an image which is displayed on a determination result display unit.

FIG. 29 is a diagram showing an example in which variables of data are defined.

FIG. 30 is a diagram showing a plurality of verification items which are allocated to each control item of 4M.

FIG. 31 is a Shewhart's control chart in which a statistic changes in a time-series manner.

FIG. 32 is a diagram showing a Shewhart's abnormality determination rule.

FIG. 33 is a diagram showing fluctuations of data occurring in a time-series manner.

FIG. 36 is a diagram showing a result of calculation of a statistic which is performed by a Shewhart analysis unit.

FIG. 37 is a diagram showing a result on which a determination process is performed in units of groups.

FIG. 38 is a diagram showing an abnormality determination based on a Shewhart analysis.

FIG. 39 is a diagram showing a result of a t-test which is performed by the Shewhart analysis unit.

FIG. 40 is a diagram showing a result of a Fisher test which is performed by the Shewhart analysis unit.

FIG. 41 is a diagram showing an image IM which is displayed on the determination result display unit.

DESCRIPTION OF EMBODIMENTS

Hereinafter, a state analysis device, a state analysis method, and a storage medium of an embodiment will be described with reference to the accompanying drawings.

First Embodiment

Figure 1:
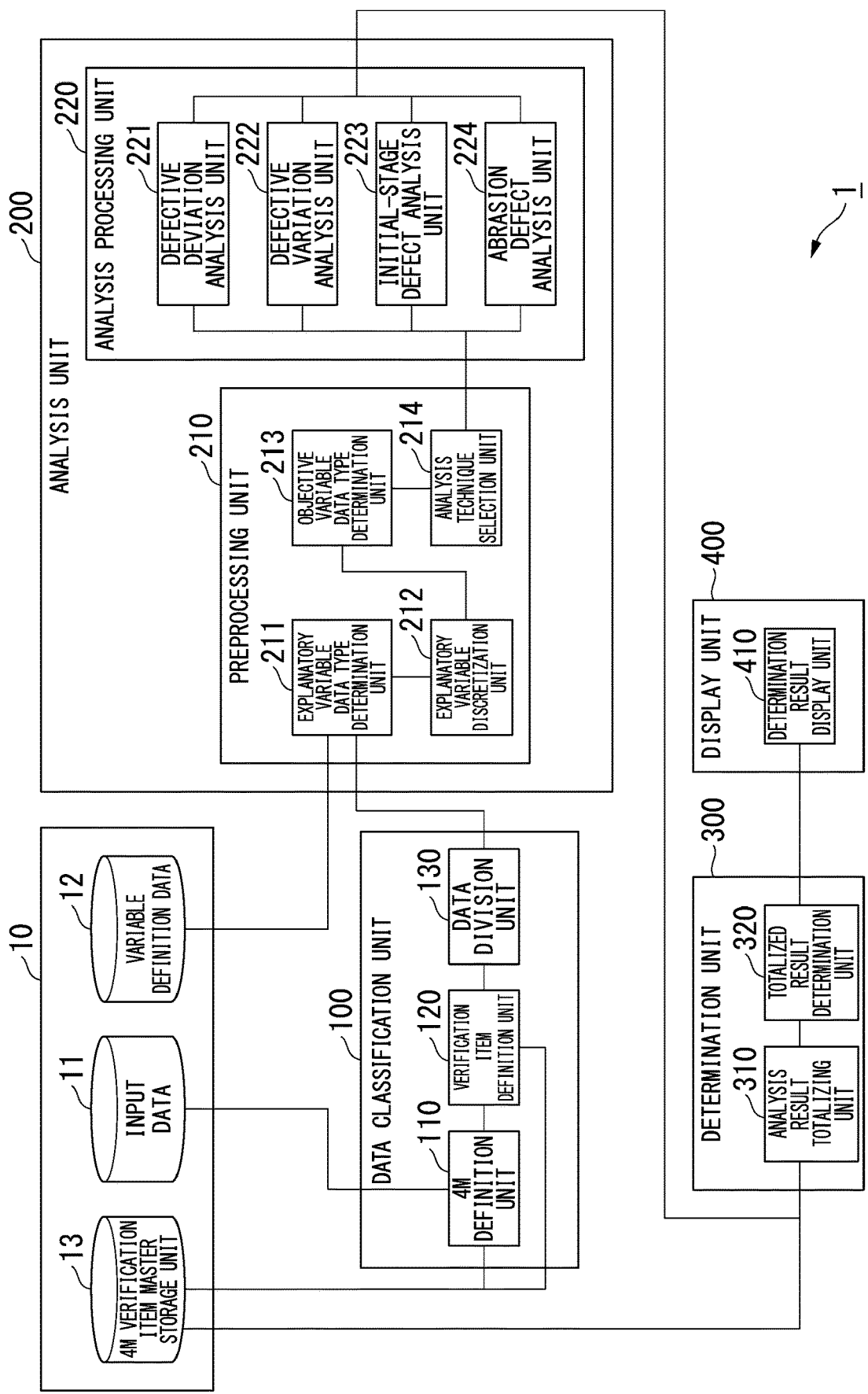
FIG. 1 is a block diagram showing a configuration of a state analysis device of a first embodiment.

FIG. 1 is a block diagram showing a configuration of a state analysis device 1 of a first embodiment. The state analysis device 1 is, for example, a device that analyzes what factor is causing a state in which a defect or the like occurs from various types of data accumulated in a process of manufacturing a product. The state analysis device 1 includes, for example, a storage unit 10, a data classification unit 100, an analysis unit 200, a determination unit 300, and a display unit 400. The storage unit 10 includes, for example, an input data storage unit 11, a variable definition data storage unit 12, and a 4M verification item master storage unit 13. The data classification unit 100 includes, for example, a 4M definition unit 110, a verification item definition unit 120, and a data division unit 130. The analysis unit 200 includes, for example, a preprocessing unit 210 and an analysis processing unit 220. The determination unit 300 includes an analysis result totalizing unit 310 and a totalized result determination unit 320. The display unit 400 includes, for example, a determination result display unit 410.

The data classification unit 100, the analysis unit 200, and the determination unit 300 are each realized by a processor such as a central processing unit (CPU) executing programs (software). Some or all of functional units of the data classification unit 100, the analysis unit 200, and the determination unit 300 may be realized by hardware such as a large scale integration (LSI), an application specific integrated circuit (ASIC), or a field-programmable gate array (FPGA), or may be realized by software and hardware in cooperation.

The storage unit 10 is a storage device having various types of data stored therein. The storage unit 10 is realized by, for example, a hard disk drive (HDD), a flash memory, an electrically erasable programmable read only memory (EEPROM), a read only memory (ROM), a random access memory (RAM), or the like. The input data storage unit 11 stores various types of input data acquired in a process of manufacturing a product.

FIG. 2 is a diagram showing an example of input data. The input data is, for example, data of a format in which data of one product is represented in one row (record). The input data is, for example, huge amounts of data of several million types which are collected from a large number, i.e., several hundreds, of manufacturing processes. An explanatory variable (independent variable) of the input data may be in a categorical (discrete data) format as in data 1, or may be a numerical value (continuous-value data) as in data 2. An objective variable (dependent variable) of the input data is data represented by 0 or 1 (for example, a non-defective product or a defective product) as in a result 1, or continuous-value data representing the degree of quality such as a yield rate as in a result 2. The data is lined up in a time-series order.

The variable definition data storage unit 12 stores a data element of the input data in a state where it is defined as an explanatory variable or an objective variable. FIG. 3 is a diagram showing an example in which variables of data are defined. As shown in the drawing, the data 1 and the data 2 of FIG. 2 are defined as explanatory variables, and the result 1 and the result 2 are defined as objective variables.

The 4M verification item master storage unit 13 stores control items and verification items for classifying the data element of the input data. FIG. 4 is a diagram showing a plurality of verification items which are allocated to each control item of 4M. The control item is defined by, for example, items of 4M used in quality control. 4M is, for example, control items which are defined as Man, Machine, Material, and Method. Other control items which are not classified in 4M may be defined in the 4M verification item master storage unit 13. These control items may be arbitrarily input by a user. Control items other than 4M mentioned above may be used, and they can be arbitrarily changed and added.

The verification items are a plurality of viewpoints for finding factors of quality defects which are defined for each control item of 4M. The verification items are, for example, items which are set on the basis of viewpoints of verification based on quality engineering or reliability engineering. As the verification items, for example, a defective deviation, a defective variation, an initial-stage defect, and an abrasion defect are defined. The verification items of a defective deviation, a defective variation, an initial-stage defect, and an abrasion defect are allocated to each of the four control items of 4M (Man, Machine, Material, and Method).

The data classification unit 100 classifies the data elements of the input data classified for each control item of 4M for each of a plurality of corresponding verification items. The data classification unit 100 classifies the data element of the input data stored in the input data storage unit 11 for each combination of the control items and the verification items of 4M stored in the 4M verification item master storage unit 13. The 4M definition unit 110 defines which of the control items of 4M stored in the 4M verification item master storage unit 13 the data elements constituting the input data correspond to. Correspondence relations between the data elements and the control items of 4M may be appropriately set by a user.

FIG. 5 is a diagram showing a relationship between the data elements of the input data and the control items of 4M. As shown in the drawing, the 4M definition unit 110 defines which category of 4M the data elements constituting the input data belong to. The relationship between the data elements and 4M may be appropriately set by a user. For example, the data 1 is allocated Material of 4M, and the data 2 is allocated Machine.

The verification item definition unit 120 defines each verification item for each data element of the input data.

FIG. 6A is a diagram showing verification items for data elements. The verification item definition unit 120 defines each verification item for each data element of the input data on the basis of the correspondence relation between data elements and 4M defined in the 4M definition unit 110 and the verification items stored in the 4M verification item master storage unit 13. For example, the verification items of the data 1 and the data 2 are allocated a defective deviation, a defective variation, an initial-stage defect, and an abrasion defect. These verification items may be appropriately set and added by a user.

The data division unit 130 maps data of explanatory variables and data of objective variables which are extracted from the data elements constituting the input data in a matrix which is constituted by 4M and verification items on the basis of results defined by the 4M definition unit 110 and the verification item definition unit 120. FIG. 6B is a diagram showing mapping results.

The analysis unit 200 analyzes the presence or absence of a failure for each combination of the control items of 4M and a plurality of verification items on the basis of the input data classified by the data classification unit 100 and variable definitions stored in the variable definition data storage unit 12. The preprocessing unit 210 converts the input data classified by the data classification unit 100 into a data format enabling analysis to be described later on the basis of a data format, and selects an analysis technique.

The preprocessing unit 210 includes an explanatory variable data type determination unit 211, an explanatory variable discretization unit 212, an objective variable data type determination unit 213, and an analysis technique selection unit 214. The explanatory variable data type determination unit 211 extracts explanatory variables of data classified by the data classification unit 100 on the basis of the variable definitions stored in the variable definition data storage unit 12, and determines whether data of each explanatory variable is continuous-value data or discrete data. The explanatory variable data type determination unit 211 determines, for example, data in which the number of types of values of data is equal to or greater than 5 (=division number+1) to be continuous-value data. The explanatory variable data type determination unit 211 determines, for example, data in which the number of types of values of data is less than 5 to be discrete data.

For example, the data 1 is discrete data, and the data 2 is continuous-value data (see FIG. 2).

In a case where the explanatory variable data type determination unit 211 determines the data of the explanatory variable to be continuous-value data, the explanatory variable discretization unit 212 performs a process of discretizing data. FIG. 7 is a diagram showing a process of discretizing explanatory variables which are continuous values. As shown in the drawing, for example, the explanatory variable discretization unit 212 divides the explanatory variables which are continuous values into four quartiles and performs discretization. FIG. 8 is a diagram showing discretized explanatory variables. As shown in FIG. 8, the explanatory variable discretization unit 212 discretizes numerical value data of the data 2 which is the explanatory variable into data values classified four divisions of L, ML, MH, and H.

In a case where the explanatory variable discretization unit 212 performs a discretization process, it is not necessary to identify whether data handled in a later process is continuous-value data or discrete data, and thus the later process becomes simple. The division number of data to be discretized may be changed to a different number as necessary. For example, the explanatory variable data type determination unit 211 identifies data in which the number of types of values of data is equal to or greater than 5 as continuous-value data, but this value may be changed in accordance with the division number of data which is divided by the explanatory variable discretization unit 212.

Next, the objective variable data type determination unit 213 identifies whether the objective variable of data is continuous-value data or discrete data. The objective variable data type determination unit 213 counts the number of types of values of the objective variable, identifies the objective variable as continuous-value data in a case where the number of types of values of the objective variable is equal to or greater than 3, and identifies the objective variable as discrete data in a case where the number of types of values of the objective variable is equal to or less than 2. For example, since there are two types of values of the result 1 which is an objective variable, 0 and 1, the objective variable data type determination unit 213 identifies the result 1 as discrete data (see FIG. 2). Since the number of types of values of the result 2 which is an objective variable is equal to or greater than 3, the objective variable data type determination unit 213 identifies the result 2 as continuous-value data (see FIG. 2).

The analysis technique selection unit 214 selects a suitable analysis algorithm for analyzing data in accordance with the result of identification performed by the objective variable data type determination unit 213 such as whether the objective variable is continuous-value data or discrete data. That is, in a case that an analysis technique is selected, the analysis technique selection unit 214 selects an analysis technique which is applied to data for each verification item on the basis of a data format. For example, in the case of the input data as shown in FIG. 2, the analysis technique selection unit 214 selects an analysis technique as discrete data with respect to data of the result 1, and selects an analysis technique as continuous-value data with respect to data of the result 2.

The analysis processing unit 220 executes a plurality of analysis processes with respect to the input data that is preprocessed by the preprocessing unit 210. The analysis processing unit 220 includes a defective deviation analysis unit 221, a defective variation analysis unit 222, an initial-stage defect analysis unit 223, and an abrasion defect analysis unit 224. That is, the analysis processing unit 220 includes a plurality of analysis units associated with each of the verification items. These analysis units may be changed depending on the verification items, or other analysis units associated with other verification items may be added.

Figure 9:
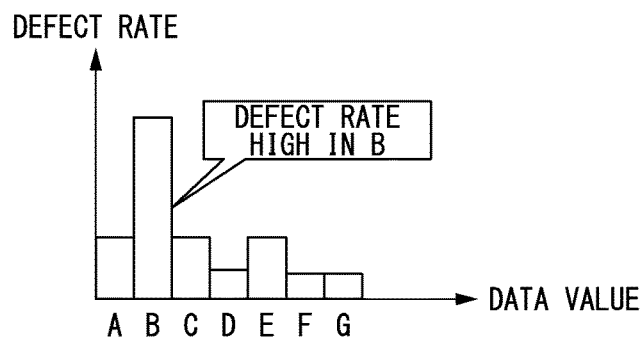
FIG. 9 is a graph showing a deviation of a defect rate.

The defective deviation analysis unit 221 analyzes the presence or absence of a failure from the viewpoint of a defective deviation. The defective deviation analysis unit 221 extracts data in which a defect rate (indicating a ratio at which an objective variable takes a value of "1"; the same hereinafter) becomes disproportionately higher. FIG. 9 is a graph showing a deviation of a defect rate. In a case that any one explanatory variable takes a certain data value, the defective deviation analysis unit 221 calculates numerical values serving as an index in which a defect rate becomes significantly higher as compared to the other cases. As shown in the drawing, for example, in a case where one part (Material) used in a product is purchased through different distribution channels A to G, a distribution channel for a part having a high defect rate can be extracted by the defective deviation analysis unit 221. The details of processing content of the defective deviation analysis unit 221 will be described later.

Figure 10:
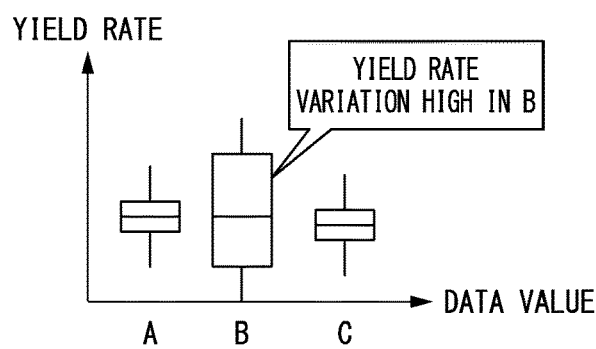
FIG. 10 is a diagram showing a variation of a yield rate.

The defective variation analysis unit 222 analyzes the presence or absence of a failure from the viewpoint of a defective variation. The defective variation analysis unit 222 extracts a data value increasing in a variation of a yield rate (objective variable). In a case that any one explanatory variable takes a certain data value, the defective variation analysis unit 222 calculates numerical values serving as an index in which a yield rate becomes significantly lower as compared to the other cases. FIG. 10 is a diagram showing a variation of a yield rate. As shown in the drawing, for example, in a case where products are assembled by workers A to C, it is possible to extract data of a yield rate of B having a great variation. The details of processing content of the defective variation analysis unit 222 will be described later.

Figure 11:
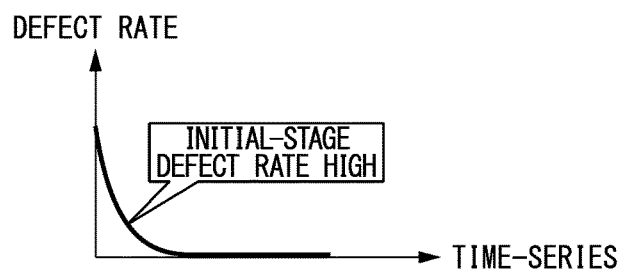
FIG. 11 is a diagram showing data having a high defect rate at an initial stage.

The initial-stage defect analysis unit 223 analyzes the presence or absence of a failure from the viewpoint of an initial-stage defect. The initial-stage defect analysis unit 223 extracts a data value representing a tendency toward an increase in a defect rate at an initial stage. At an initial stage of manufacturing performed under manufacturing conditions in which any one explanatory variable continues to take a certain data value, the initial-stage defect analysis unit 223 calculates numerical values serving as an index in which a defect rate becomes significantly higher as compared to the other cases. FIG. 11 is a diagram showing data having a high defect rate at an initial stage. For example, in a case that a certain part is used in a product and an initial stage of manufacturing of the product is not stable but a defect occurs, an analysis performed by the initial-stage defect analysis unit 223 seeks to discover a cause due to the part. The details of processing content of the initial-stage defect analysis unit 223 will be described later.

Figure 12:
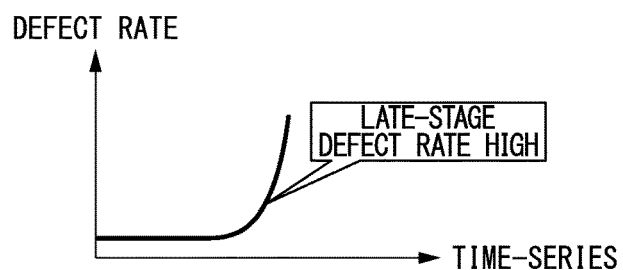
FIG. 12 is a diagram showing data having a high defect rate at a late stage.

The abrasion defect analysis unit 224 analyzes a correlation between respective control items of 4M and verification items of an abrasion defect. The abrasion defect analysis unit 224 extracts a data value representing a tendency toward an increase in a defect rate toward a late stage. At a late stage of manufacturing performed under manufacturing conditions in which any one explanatory variable continues to take a certain data value, the abrasion defect analysis unit 224 calculates numerical values serving as an index in which a defect rate becomes significantly higher as compared to the other cases. FIG. 12 is a diagram showing data having a high defect rate at a late stage. For example, in a case that a certain material continues to be used and the material deteriorates in a late stage of manufacturing and causes a defect, an analysis performed by the abrasion defect analysis unit 224 seeks to discover a cause due to a part. The details of processing content of the abrasion defect analysis unit 224 will be described later.

In summary, the analysis unit 200 identifies whether the explanatory variable and the objective variable of data is continuous-value data or discrete data in a case that a data format of the data is identified. The analysis unit 200 performs a process of discretizing the data into discrete data in a case where the explanatory variable is identified as continuous-value data, and selects an analysis technique which is applied to the data in accordance with the identification result of the objective variable.

Hereinafter, the specific content of each analysis process will be described in detail.

The defective deviation analysis unit 221 performs a t-test or a Fisher test in accordance with the type of data. For example, in a case where the objective variable is continuous-value data, the defective deviation analysis unit 221 performs a t-test for each data value of the explanatory variable. In the t-test, a greater absolute value of a calculated t-value is determined to be more significant. The defective deviation analysis unit 221 calculates a p-value in order to inspect whether a significant difference occurs in the average value of the objective variable. The p-value serves as an index for determining the significance of a difference between average values obtained from sample data, a null hypothesis is rejected in a case that the p-value is small, and differences that are not incidental but are definitely statistically significant are determined based on sampling.

FIG. 13 is a diagram showing a t-test which is performed by the defective deviation analysis unit 221. Here, the t-test is performed on an objective variable 2 in a case where the data 1 which is an explanatory variable takes a value A. The defective deviation analysis unit 221 calculates the number of samples and the average value and standard deviation of the objective variable 2 in a case where the data 1 is the value A and other cases. Thereafter, the defective deviation analysis unit 221 performs the t-test and inspects whether a significant difference is present in the average value. The defective deviation analysis unit 221 executes such a process with respect to the data values of all the explanatory variables. FIG. 14 is a diagram showing a calculation result of a list of p-values of the t-test which is performed by the defective deviation analysis unit 221.

In a case where the objective variable is discrete data, the defective deviation analysis unit 221 performs a Fisher test for each data value of the explanatory variable. The defective deviation analysis unit 221 calculates a p-value in order to inspect whether a frequency at which the objective variable takes a value of "1 (qualifies as a defective product, for example)" becomes significantly higher in each data value.

FIG. 15 is a diagram showing a Fisher test which is performed by the defective deviation analysis unit 221. The Fisher test is a test method for data divided into a 2×2 contingency table. The above test is performed on the objective variable 1 in a case where the data 1 which is an explanatory variable is the value A. The defective deviation analysis unit 221 calculates the amount of data in which the value of the objective variable 1 (result 1) is set to "1 (for example, a defective product)" or "0 (for example, a non-defective product)" in a case where the data 1 takes the value A and other cases. The defective deviation analysis unit 221 inspects whether a significant difference is present in a frequency at which the value of the objective variable 1 is set to "1." The defective deviation analysis unit 221 executes such a procedure with respect to the data values of all the explanatory variables, and outputs a list of p-values as a result. FIG. 16 is a diagram showing a calculation result of a list of p-values of the Fisher test which is performed by the defective deviation analysis unit 221.

The defective variation analysis unit 222 executes a process only in a case where the objective variable of data is a continuous value. In a case where the objective variable is a continuous value, the defective deviation analysis unit 222 performs an F-test for each data value of the explanatory variable. The F-test is a statistical test which is performed on the assumption that a test statistic is in accordance with an F-distribution under a null hypothesis. In a case that the ratio of standard deviation between two groups is set as a statistic F, the F-distribution is a distribution in which F is in accordance with an F-distribution in a case where both groups are in accordance with a normal distribution. FIG. 17 is a diagram showing an F-test which is performed by the defective variation analysis unit 222.

The defective variation analysis unit 222, for example, calculates the number of samples and standard deviation in a case where the data 1 takes the value A and other cases, and performs an F-test to inspect whether a significant difference is present in the standard deviation. The defective variation analysis unit 222 calculates a p-value in order to inspect whether a significant difference is present in the standard deviation of the objective variable. FIG. 18 is a diagram showing a calculation result of a list of p-values of the F-test which is performed by the defective variation analysis unit 222.

The defective variation analysis unit 222 does not execute a process in a case where the objective variable of data is a discrete value. In a case where the objective variable takes only a discrete value of "0" or "1", the distribution of values of the objective variable is in accordance with a binomial distribution. This is because a difference in variation is equivalent to a difference in average value calculated by the defective deviation analysis unit 221, which does not indicate recalculation.

Next, in analysis processes which are performed by the initial-stage defect analysis unit 223 and the abrasion defect analysis unit 224, data for each data value is divided into an initial stage, a middle stage, and a late stage in preprocessing. FIG. 19 is a diagram showing data that is preprocessed before a test. The initial-stage defect analysis unit 223 and the abrasion defect analysis unit 224 count how many times each data value has appeared continuously, divide the number of counts into three regions in an initial stage, a middle stage, and a late stage, and allocate the data to each region in accordance with the number of counts. As shown in the drawing, for example, the numbers of counts 1 to 6 of consecutive A of the data 1 are divided into an initial stage, a middle stage, and a late stage. The remaining processes are performed in almost the same procedure as the process of the defective deviation analysis unit 221.

FIG. 20 is a diagram showing a result of the t-test which is performed by the initial-stage defect analysis unit 223. As shown in the drawing, the initial-stage defect analysis unit 223 performs the t-test in a case where the objective variable is a continuous value. In order to analyze a defect at an initial stage, the initial-stage defect analysis unit 223 performs a significant difference test for the objective variable 2, for example, in a case where the explanatory variable data 1 is the value A and a counter is at an initial stage. The initial-stage defect analysis unit 223 performs a Fisher test in a case where the objective variable is a discrete value. FIG. 21 is a diagram showing the Fisher test which is performed by the initial-stage defect analysis unit 223.

The initial-stage defect analysis unit 223 executes the above process with respect to the data values of all the explanatory variables. The initial-stage defect analysis unit 223 outputs a list of p-values as a result, FIG. 22 is a diagram showing a calculation result of a list of p-values of the t-test or the Fisher test which is performed by the initial-stage defect analysis unit 223.

The analysis process which is performed by the abrasion defect analysis unit 224 is basically the same as the process of the initial-stage defect analysis unit 223. In order to analyze a defect at a late stage, the abrasion defect analysis unit 224 performs a significant difference test for the objective variable 2, for example, in a case where the explanatory variable data 1 is the value A and a counter is at a late stage. The analysis process of the abrasion defect analysis unit 224 executes completely the same process as the process performed at an initial stage of a counter by the initial-stage defect analysis unit 223 at a late stage of a counter. All analysis processes in the analysis unit 200 are terminated with the above process.

The determination unit 300 totalizes analysis results analyzed by the analysis unit 200 and determines the presence or absence of a failure with respect to a combination of each control item and each determination item on the basis of the totalized result. The determination unit 300 maps the obtained analysis results again in a matrix of 4M×analysis items.

The analysis result totalizing unit 310 totalizes the minimum values (bold letters) of the p-value for each verification item with respect to the control items of 4M. FIG. 23 is a diagram in which analysis results in a case where an analysis unit is the defective deviation analysis unit 221 are totalized. The analysis result totalizing unit 310 totalizes analysis results of all the analysis units similarly. FIG. 24 is a diagram in which analysis results of all the analysis units are totalized.

Next, the totalized result determination unit 320 determines the presence or absence of a failure with respect to a combination of each control item and each determination item on the basis of each p-value. The totalized result determination unit 320 determines which of failure possibility high (p-value less than 1%), failure possibility medium (p-value equal to or greater than 1% and less than 5%), and failure possibility low (p-value equal to or greater than 5%) each p-value corresponds to. That is, the totalized result determination unit 320 determines the significance of relations between the objective variable and data by division into a plurality of stages with respect to a combination of each control item and each determination item. The totalized result determination unit 320 uses values of 1% and 5% as thresholds, but these values may be changed as necessary.

The display unit 400 includes the determination result display unit 410 that displays the determination results of the determination unit 300 as an image IM. FIG. 25 is a diagram showing an image IM which is displayed on the determination result display unit 410. In the image IM, the respective determination results of the determination unit 300 are displayed in a matrix of 4M (control items)×each analysis unit (verification items). In each display column of the matrix of the image IM, a determination result is displayed with, for example, a color change.

For example, in a case where the possibility of a failure is low, a blue signal may be displayed in each display column of the matrix of the image IM. In a case where the possibility of a failure is medium, a yellow signal may be displayed in each display column of the matrix of the image IM. In a case where the possibility of a failure is high, a red signal may be displayed in each display column of the matrix of the image IM. In a case where there is no data, a display column of the matrix of the image IM may not be displayed. An operator can ascertain the presence or absence of a failure in a combination of each control item and each verification item by discerning the color of the image IM.

Figure 26:
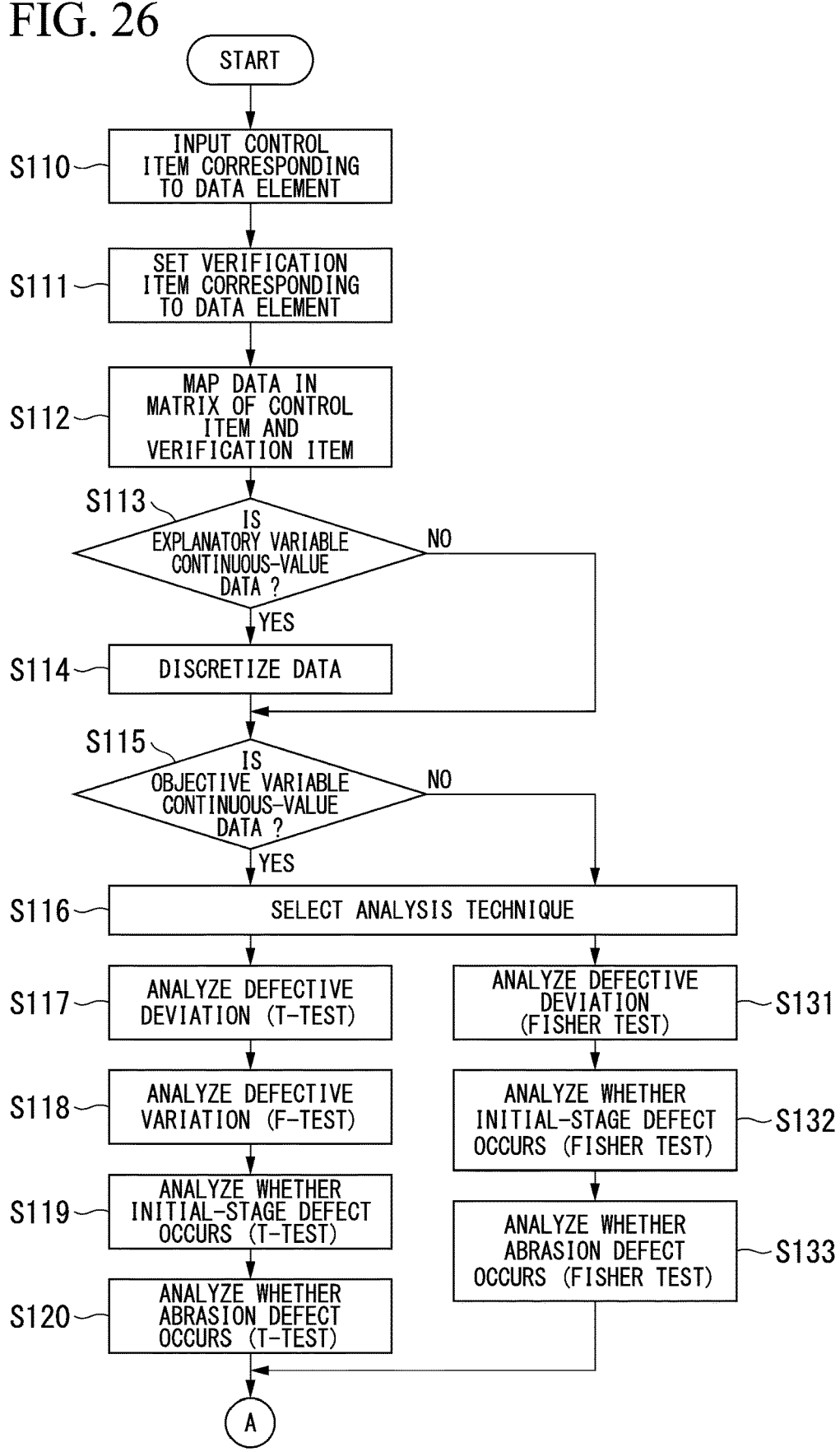
FIG. 26 is a flow chart showing processes of the state analysis device.
Figure 27:
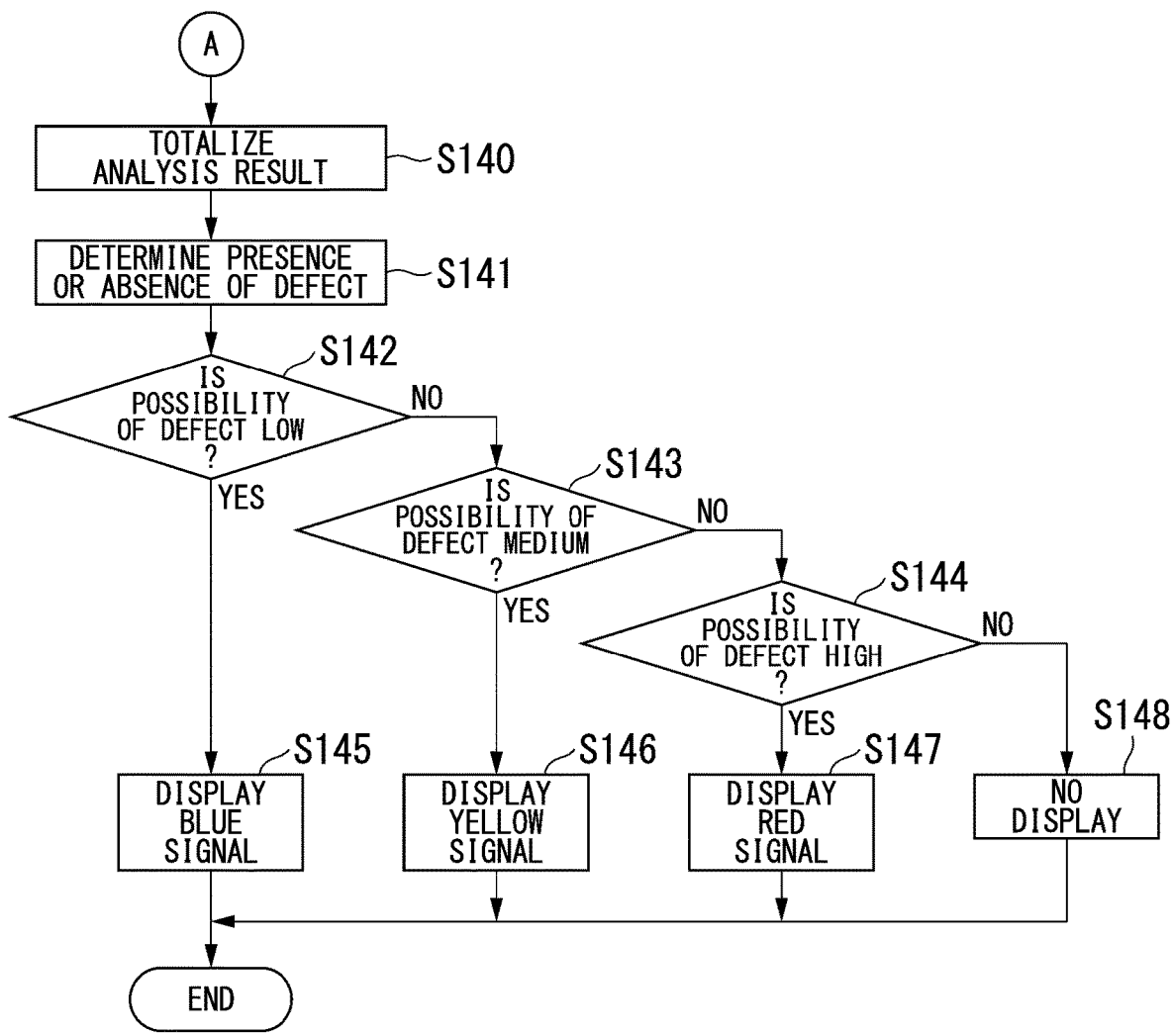
FIG. 27 is a flow chart showing processes of the state analysis device.

Hereinafter, a flow of processes of the state analysis device 1 will be described. FIGS. 26 and 27 are flow charts showing processes of the state analysis device 1. In the 4M definition unit 110, data associated with the control items of 4M is input (step S110). In the verification item definition unit 120, the verification items are input (step S111). The data division unit 130 maps the input data in a matrix which is constituted by the control items of 4M and the verification items (step S112).

The explanatory variable data type determination unit 211 determines whether an explanatory variable of the mapped data is continuous-value data (step S113). In a case where the explanatory variable is continuous-value data (step S113: Yes), the explanatory variable discretization unit 212 discretizes data of the explanatory variable (step S114).

In a case where the explanatory variable is not continuous-value data but discrete data (step S113: No), the flow proceeds to the process of step S115. The objective variable data type determination unit 213 determines whether the objective variable of data is continuous-value data (step S115). In a case where the objective variable is continuous-value data (step S115: Yes), the analysis technique selection unit 214 selects a suitable analysis algorithm for analyzing the continuous-value data (step S116).

In a case where the objective variable is continuous-value data, the defective deviation analysis unit 221 analyzes a defective deviation in a t-test (step S117). In a case where the objective variable is continuous-value data, the defective variation analysis unit 222 performs an F-test for each data value of the explanatory variable (step S118).

In a case where the objective variable is a continuous value, the initial-stage defect analysis unit 223 performs the t-test (step S119). In a case where the objective variable is a continuous value, the abrasion defect analysis unit 224 performs the t-test (step S120). In step S115, in a case where the objective variable is not continuous-value data but discrete data (step S115: No), the analysis technique selection unit 214 selects a suitable analysis algorithm for analyzing the discrete data (step S116). In a case where the objective variable is discrete data, the defective deviation analysis unit 221 analyzes a defective deviation in a Fisher test (step S131).

In a case where the objective variable is discrete data, the defective variation analysis unit 222 does not execute a process. In a case where the objective variable is a discrete value, the initial-stage defect analysis unit 223 performs the Fisher test (step S132). In a case where the objective variable is a discrete value, the abrasion defect analysis unit 224 performs the Fisher test (step S133). The analysis result totalizing unit 310 totalizes analysis results for each verification item with respect to the control items of 4M (step S140).

The totalized result determination unit 320 determines the presence or absence of a failure on the basis of the analysis results (step S141). In a case where the possibility of a failure is low (step S142: Yes), the determination result display unit 410 displays a blue signal.

In a case where the possibility of a failure is medium (step S143: Yes), the determination result display unit 410 displays a yellow signal. In a case where the possibility of a failure is high (step S144: Yes), the determination result display unit 410 display a red signal. In a case where there is no data, the determination result display unit 410 displays nothing.

According to the first embodiment described above, the state analysis device 1 includes the data classification unit 100, the analysis unit 200, and the determination unit 300, whereby states occurring in a product can be comprehensively analyzed at once using various analysis techniques. That is, according to the state analysis device 1, it is possible to analyze what factor is causing a state in which a defect or the like occurs on the basis of a huge amount of various types of data accumulated in a process of manufacturing a product. According to the state analysis device 1, it is possible to easily ascertain the state of occurrence of a defect or the like in a visualized aspect in a plurality of verification items associated with a plurality of control items.

Specifically, according to the state analysis device 1, in a case where the input data has a constant data format, it is possible to automatically output a bird's-eye view for displaying a failure in a matrix of four analysis techniques used in 4M (+Other)×quality engineering with respect to any data. Thereby, according to the state analysis device 1, it is possible to easily ascertain where in quality control a problem is present in a short period of time without the need to do trial and error for the analysis technique, and to prevent failure to notice a viewpoint.

Second Embodiment

In the first embodiment, a description has been given of a case in which the analysis unit 200 analyzes whether the factor of each verification item of a defective deviation, a defective variation, an initial-stage defect, and an abrasion defect occurs. The viewpoint of analysis is not limited to the above, and a configuration in which other analysis techniques are performed may be added to the analysis unit 200. In a second embodiment, further verification items are added to the above verification items to analyze the factors of defects.

Figure 28:
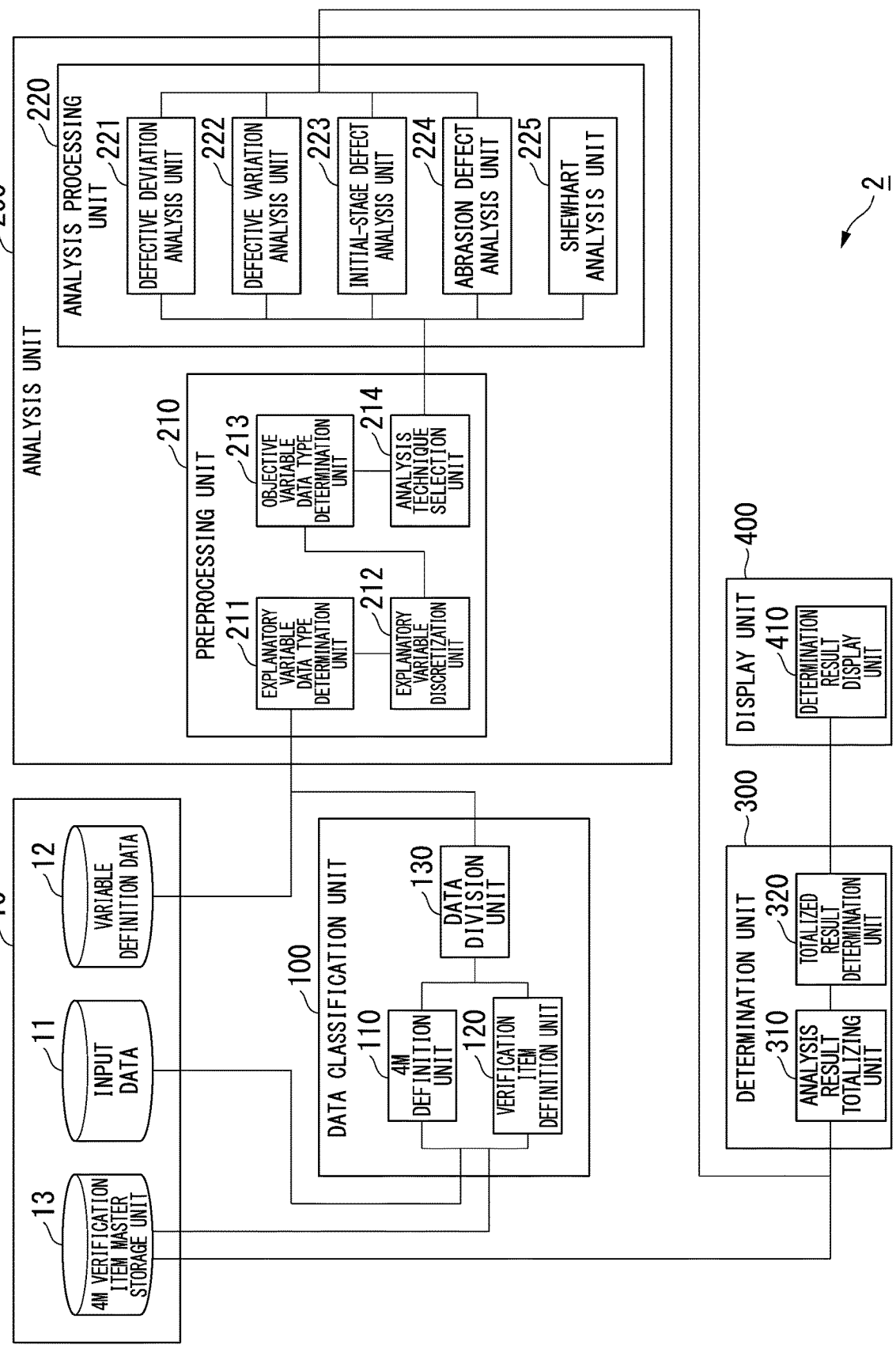
FIG. 28 is a block diagram showing a configuration of a state analysis device of a second embodiment.

FIG. 28 is a block diagram showing a configuration of a state analysis device 2 of the second embodiment. The state analysis device 2 is configured such that a Shewhart analysis unit 225 which is another analysis technique different from the verification items already prepared is added to the analysis unit 200 as compared to the first embodiment. A verification item of Shewhart analysis which is another verification item different from the verification items already prepared is also additionally stored in the 4M verification item master storage unit 13. In the state analysis device 2, it is possible to freely select verification items by adding or deleting verification items of analysis and processing blocks.

FIG. 29 is a diagram showing an example in which variables of data are defined. As will be described later, in order to perform analysis based on a Shewhart's control chart, it is necessary to determine variables used to define a group unit called a "group", and data 1 corresponds to this variable in this example. FIG. 30 is a diagram showing a plurality of verification items which are allocated to each control item of 4M. Here, a verification item of Shewhart analysis is added as compared to the first embodiment (see FIG. 4).

FIG. 31 is a Shewhart's control chart in which a statistic changes in a time-series manner. The Shewhart analysis is a technique for determining whether variation in a case that statistics calculated from data are lined up in a time-series order changes to abnormal variation statistically very rarely. As shown in the drawing, drastic variation data is confirmed one day, but in the Shewhart analysis, it is analyzed whether this variation is abnormal variation.

FIG. 32 is a diagram showing a Shewhart's abnormality determination rule. As shown in the drawing, the determination of abnormality is performed based on whether it corresponds to eight rules. FIG. 33 is a diagram showing variations of data occurring in a time-series manner. As shown in the drawing, in the point of view of the Shewhart's control chart, average intragroup variation within a temporal block (hereinafter called a "group") in which quality elements (4M) in a production process are regarded as uniform is regarded as occasional variation (usual state) as in a group 1. In the point of view of the Shewhart's control chart, intragroup variation as in a group 2 and intergroup variation as in a group 3 (state different from usual) which are not able to be described in the occasional variation are detected as abnormalities.

Figures 34, 35:
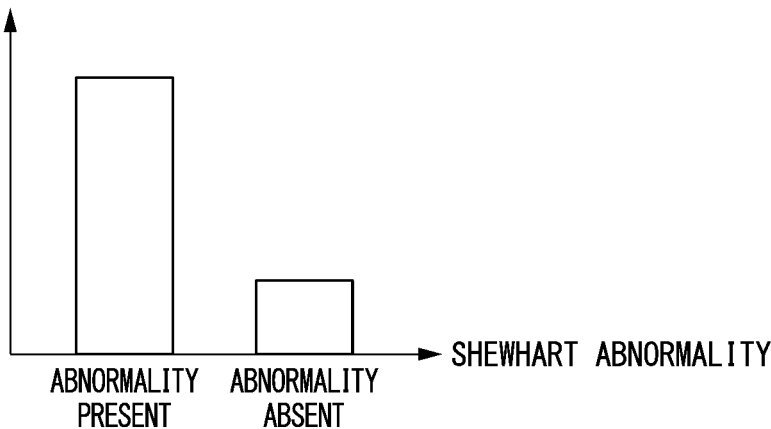
FIG. 34 is a diagram showing an abnormality analyzed by a Shewhart analysis.
FIG. 35 is a diagram showing input data used in a Shewhart analysis.

In the Shewhart's control chart, statistics calculated from each group of data are plotted (see FIG. 31). The statistic is, for example, an average value, a median value, a variation (a difference between a maximum value and a minimum value), or the like of a group. FIG. 34 is a diagram showing an abnormality analyzed by a Shewhart analysis. In an analysis based on the Shewhart control chart, whether there is a relevance between a Shewhart abnormality and a defect is inspected by comparing defect rates in a group in which an abnormality has occurred and a group in which has not occurred.

Hereinafter, a specific procedure of analysis performed by the Shewhart analysis unit 225 will be described. In a case that a Shewhart analysis is performed, which data is a variable for specifying a group (hereinafter called a group variable) is defined in variable definition data (see FIG. 29). "Shewhart" is added to the verification items of the 4M verification item master storage unit 13. The Shewhart analysis unit 225 is added to the analysis unit 200. Here, in a case where the verification items of the 4M verification item master storage unit 13 and the Shewhart analysis unit 225 of the analysis unit 200 are added, they may be set by a user, or may be automatically added by being connected to another state analysis device 2.

FIG. 35 is a diagram showing input data used in a Shewhart analysis. The data 1 is assumed to be designated as a group variable in the variable definition data storage unit 12 with respect to input data which is a target for analysis. The data is assumed to be lined up in a time-series order. In this condition, in a case where group variables continues to take the same value, the data is considered as belonging to the same group, the input data is divided in units of groups by the data division unit 130, and a statistic (for example, an average value) is calculated for each group by the Shewhart analysis unit 225.

FIG. 36 is a diagram showing a result of calculation of a statistic which is performed by the Shewhart analysis unit 225. In a case where numerical values are plotted in a graph, a time-series graph is obtained (see FIG. 31). The Shewhart analysis unit 225 retrieves whether there is a group associated with any of eight rules (see FIG. 32) in a statistic calculated in units of groups. In a case where there is a group associated with eight rules as a result of retrieval, the Shewhart analysis unit 225 determines that an abnormality has occurred in the group. FIG. 37 is a diagram showing a result in which a determination process is performed in units of groups. Next, the Shewhart analysis unit 225 develops data of FIG. 37 into data of an original individual unit serving as a group unit, and determines an abnormality having occurred in each of consecutive groups.

FIG. 38 is a diagram showing an abnormality determination based on a Shewhart analysis. As shown in the drawing, in a case where one group is determined as an abnormality, for example, as in a group 5, the Shewhart analysis unit 225 handles the group as abnormalities having occurred in all individuals included in the group. Thereafter, the Shewhart analysis unit 225 determines whether there is a relevance between the Shewhart abnormality and the objective variable through a test. The Shewhart analysis unit 225 executes a test in an individual set having a Shewhart abnormality and an individual set not having it. This process is the same as the procedure of analyzing a defective deviation described in the first embodiment.

The Shewhart analysis unit 225 performs a t-test, for example, in a case where the objective variable of the input data is a continuous value. FIG. 39 is a diagram showing a result of the t-test which is performed by the Shewhart analysis unit 225. The Shewhart analysis unit 225 performs a Fisher test, for example, in a case where the objective variable of the input data is a discrete value, and obtains a test p-value. FIG. 40 is a diagram showing a result of the Fisher test which is performed by the Shewhart analysis unit 225. The subsequent processes are the same as those in the first embodiment in the state analysis device 2.

In a case where test p-values are totalized in a matrix consisting of 4M and each verification item in the determination unit 300, and are visualized by an image IM representing a determination result in the display unit 400, mapping obtained by adding analysis performed by the Shewhart's control chart is completed. FIG. 41 is a diagram showing an image IM which is displayed on the determination result display unit.

Figure 42:
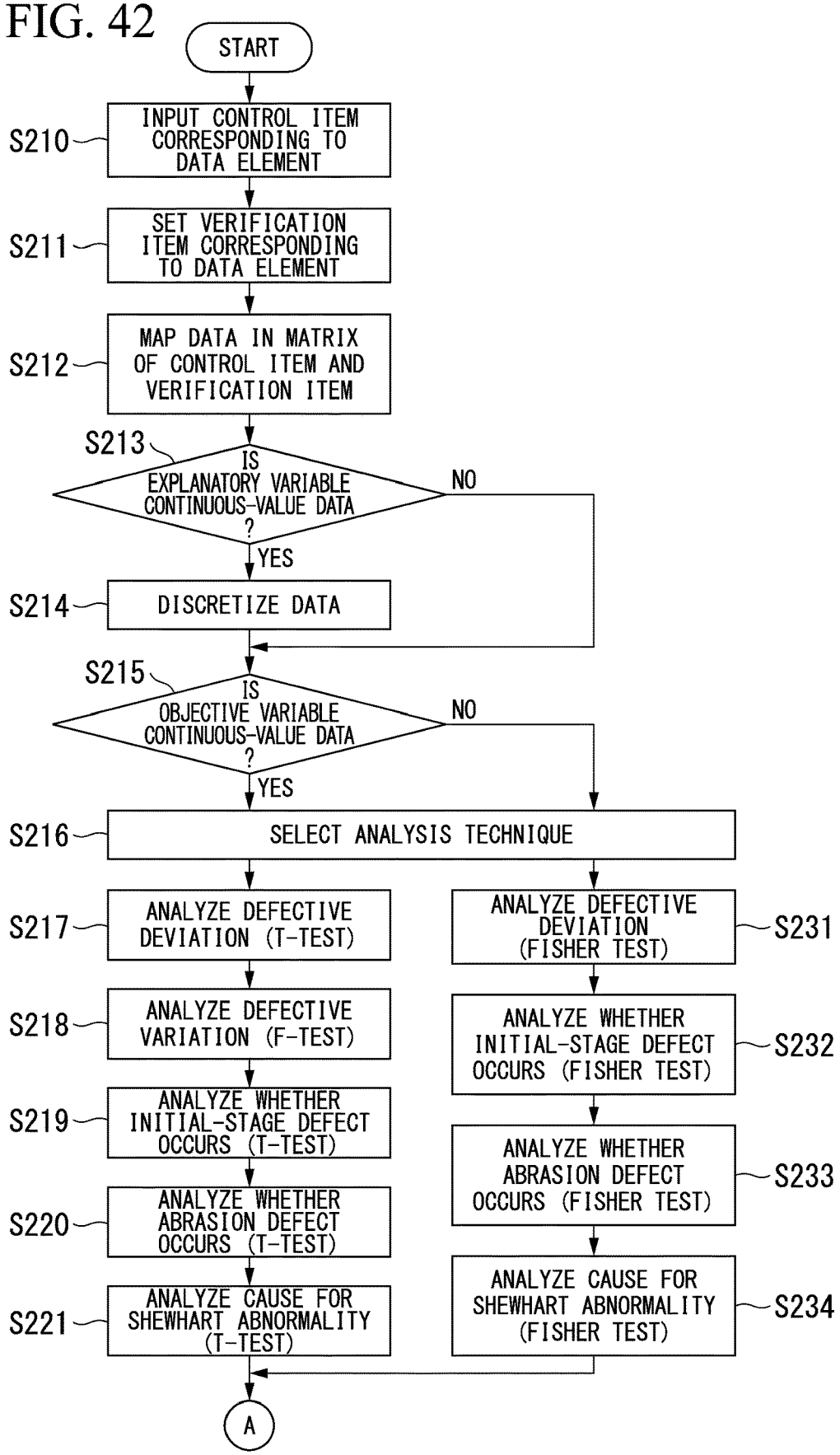
FIG. 42 is a flow chart showing processes of the state analysis device.
Figure 43:
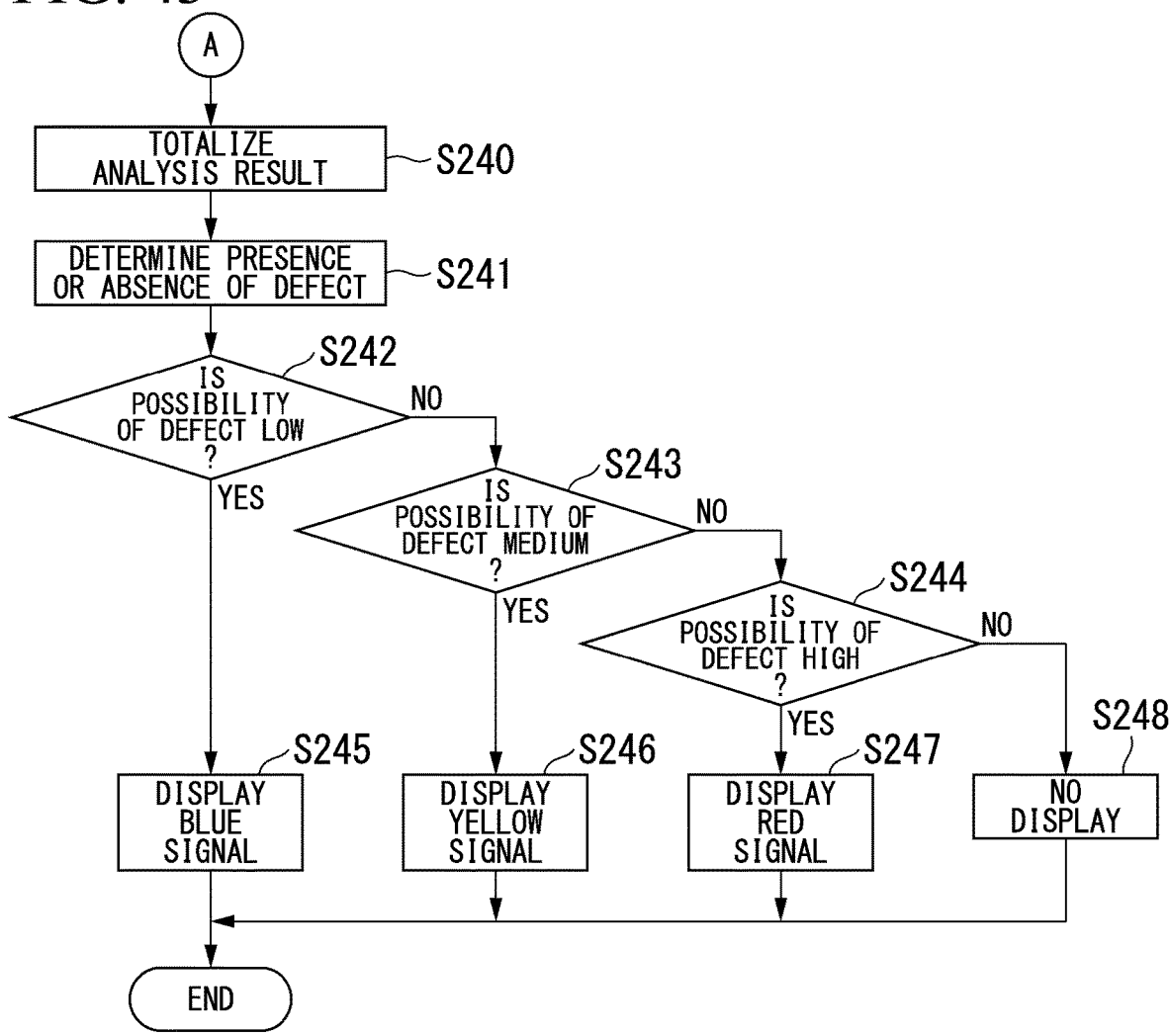
FIG. 43 is a flow chart showing processes of the state analysis device.

Hereinafter, the process of the state analysis device 2 will be described. Since processes other than processes of analysis performed by the Shewhart analysis unit 225 in S221 and S234 are the same as the processes in the first embodiment, only the process content of S221 and S234 will be described below. FIGS. 42 and 43 are flow charts showing processes of the state analysis device 2.

In the verification item definition unit 120, a verification item obtained by adding a Shewhart analysis is input (step S211). The Shewhart analysis unit 225 calculates a statistic for each group of the explanatory variable of data, and determines whether the statistic corresponds to the Shewhart's abnormality determination rule for each group. In a case where the objective variable is a continuous value, the Shewhart analysis unit 225 executes a t-test in an individual set having a Shewhart abnormality and an individual set not having it, and calculates a test p-value (step S221). In a case where the objective variable is a discrete value, the Shewhart analysis unit 225 executes a Fisher test in an individual set having a Shewhart abnormality and an individual set not having it, and calculates a test p-value (step S234).

According to the state analysis device 2 of the second embodiment described above, another analysis unit is added to the analysis unit 200, whereby a user can easily ascertain a state in which a defect or the like occurs in a desired verification item in a visualized aspect. Specifically, according to the state analysis device 2, a "state different from usual (abnormality)" having an influence on quality can be automatically extracted by adding analysis based on the Shewhart's control chart.

According to at least one embodiment described above, the state analysis device 1 includes the data classification unit 100, the analysis unit 200, and the determination unit 300, thereby allowing states occurring in a product to be analyzed using various analysis techniques.

While certain embodiments of the present invention have been described, these embodiments have been presented by way of example only, and are not intended to limit the scope of the present application. Indeed, these embodiments described herein may be embodied in a variety of other forms; furthermore, various omissions, substitutions and changes in the form of the embodiments described herein may be made without departing from the spirit of the present application. The appended claims and their equivalents are intended to cover such forms or modifications as would fall within the scope and spirit of the present application. For example, the state analysis device of the embodiment can be applied in order to analyze defect factors other than a manufacturing line in addition to being applied to a case in which the defect factor of a manufacturing line is analyzed.

What is claimed is:

1. A state analysis device comprising:
a data classification unit that is configured to classify input data in accordance with which of a plurality of verification items associated with a plurality of control items the data corresponds to;
an analysis unit that is configured to execute analysis associated with each combination of the plurality of control items and the plurality of verification items on the basis of the data classified by the data classification unit; and
a determination unit that is configured to determine analysis results in units of combinations of the verification items for the control items on the basis of analysis results analyzed by the analysis unit.

2. The state analysis device according to claim 1, wherein, in a case that the analysis is executed, the analysis unit is configured to identify a data format of the data, and select an analysis technique for executing the analysis on the basis of the data format.

3. The state analysis device according to claim 2, wherein, in a case that the analysis technique is selected, the analysis unit is configured to select an analysis technique which is applied to the data for each of the verification items on the basis of the data format.

4. The state analysis device according to claim 2, wherein, in a case that the data format of the data is identified, the analysis unit is configured to determine whether the data is continuous-value data or discrete data, and perform a process of discretizing the data into discrete data in a case where it is determined that the data is the continuous-value data.

5. The state analysis device according to claim 1, wherein, as verification items and analysis techniques used in analysis of the analysis unit, another verification item different from verification items already prepared and another analysis technique for analyzing the another verification item are capable of being added.

6. The state analysis device according to claim 1, further comprising an output unit that is configured to output a determination result of significance determined by the determination unit in accordance with each of the verification items for each of the control items.

7. A state analysis method comprising causing a computer to:
classify input data in accordance with which of a plurality of verification items associated with a plurality of control items the data corresponds to;
execute analysis associated with each combination of the plurality of control items and the plurality of verification items on the basis of the classified data; and
determine analysis results in units of combinations of the control items and the verification items on the basis of analyzed analysis results.

8. A non-transitory computer readable storage medium having a state analysis program stored therein, the program causing a computer to:
classify input data in accordance with which of a plurality of verification items associated with a plurality of control items the data corresponds to;
execute analysis associated with each combination of the plurality of control items and the plurality of verification items on the basis of the classified data; and
determine analysis results in units of combinations of the control items and the verification items on the basis of analyzed analysis results.

* * * * *